United States Patent [19]

Phillips

[11] Patent Number: 4,633,373
[45] Date of Patent: Dec. 30, 1986

[54] LITHIUM/VALVE METAL OXIDE/VALVE METAL CAPACITOR

[75] Inventor: Jeffrey Phillips, Denver, Colo.

[73] Assignee: United Chemi-Con, Inc., Rosemont, Ill.

[21] Appl. No.: 681,462

[22] Filed: Dec. 14, 1984

[51] Int. Cl.[4] .......................... H01G 9/00; H01M 6/18
[52] U.S. Cl. ..................................... 361/433; 252/62.2
[58] Field of Search .................. 252/62.2; 361/433 A, 361/433 L, 433 S, 433 E

[56] References Cited

U.S. PATENT DOCUMENTS

| | | | |
|---|---|---|---|
| 2,862,157 | 11/1958 | Haring et al. | 361/433 E |
| 2,908,849 | 10/1959 | Taylor | 361/433 L |
| 3,290,561 | 12/1966 | Burnham | 252/62.2 X |
| 3,410,766 | 11/1968 | Schmidt | 361/433 A X |
| 3,548,265 | 12/1970 | Buice et al. | 361/433 L |
| 4,221,851 | 9/1980 | Faust et al. | 252/62.2 X |
| 4,434,216 | 2/1984 | Joshi et al. | 252/62.2 X |
| 4,438,481 | 3/1984 | Phillips et al. | 252/62.2 X |

Primary Examiner—Donald A. Griffin
Attorney, Agent, or Firm—Mason, Kolehmainen, Rathburn & Wyss

[57] ABSTRACT

A lithium or lithium alloy cathode, instead of the cathode foils of commercial electrolytic capacitors, can substantially increase the volumetric energy density of a valve metal/metal oxide capacitor. The capacitors exhibit a voltage capability unexpectedly higher than the voltage supported by the anode alone. This unexpected advantage is achieved by constructing a capacitor including (1) a negative electrode comprising lithium or a lithium alloy; (2) a positive electrode comprising a relatively high surface area valve metal having a relatively thin oxide surface film; (3) a separator material disposed between the positive and negative electrodes to physically separate the electrodes and capable of allowing the passage of ions through the material between the electrodes and (4) an organic, non-aqueous electrolyte containing lithium ions and compatible with both electrodes.

24 Claims, 9 Drawing Figures

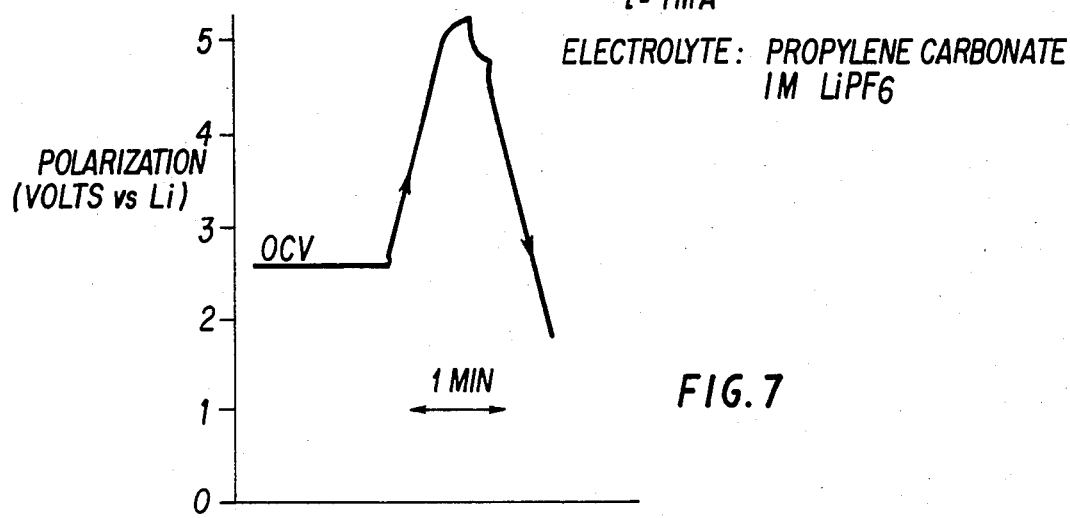
FIG. 7 POLARIZATION CURVE FOR THERMALLY OXIDIZED ROLLED FOR $i = 1 mA$
ELECTROLYTE: PROPYLENE CARBONATE 1M LiPF6
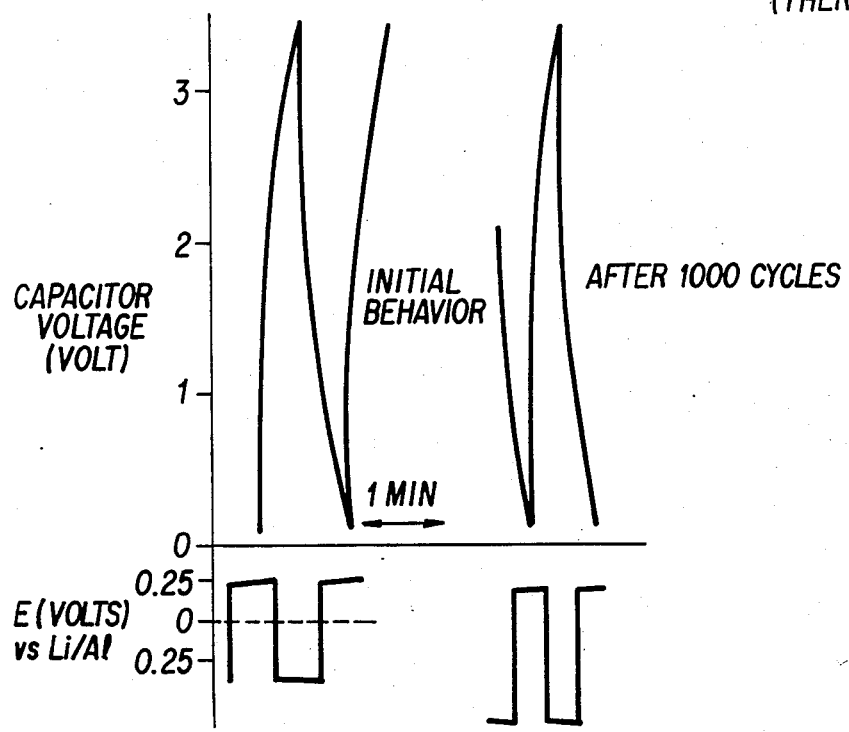
FIG. 8 CYCLING PERFORMANCE OF THE Li/Al‖Al$_2$O$_3$/Al CAPACITOR (THERMAL OXIDE)

LITHIUM/VALVE METAL OXIDE/VALVE METAL CAPACITOR

FIELD OF THE INVENTION

The present invention is directed to a new volumetrically efficient capacitor. More particularly, the present invention is directed to capacitors constructed to include an oxide film coated positive metal electrode, a lithium or lithium alloy negative electrode and an ionically conducting lithium-ion containing electrolyte. The two electrodes are physically separated by an ion-conducting separator material. In accordance with a preferred embodiment, the metal oxide coated positive electrode is an aluminum/aluminum oxide or tantalum/tantalum oxide rolled foil.

BACKGROUND OF THE INVENTION

Electronic equipment controlled by microcomputer requires a reserve power source to protect the microcomputer system from memory loss resulting from a momentary main power shut-down. A reserve power source for microcomputers must be small in size yet have sufficient capacitance to store enough electric charge to protect the computer memory from erasure during momentary power failure.

New capacitors have been developed in an attempt to provide a reserve power supply having a small size and increased capacitance, including an activated carbon electrode and an ionically conductive sulfuric acid electrolyte (see Sanada and Hosokawa, Electric Double Layer Capacitor "Super Capacitor", NEC Research and Development, No. 55 Oct. 1979, pages 21–27). The unit cell voltage for the "Super Capacitor" is 1.2 volts. Accordingly, to achieve the required voltage for microcomputer memory protection of, say 5 volts D.C., it is necessary to stack several unit cells.

This assignee, similarly, has developed a new capacitor having a high surface area carbon-electrolyte electrode, a lead metal-electrolyte electrode, and an ionically conductive electrolyte to achieve a capacitor having a high capacitance and a small volume, Phillips et al. U.S. Pat. No. 4,438,481. Again, however, the maximum voltage each cell can support is only about 1.25 V D.C. making it necessary to stack a plurality of cells in series to achieve the required operating voltage of, for example, 3 to 5 V D.C.

It is well known in the art of capacitor manufacturing that the necessity of stacking capacitors is time consuming, may require selection and testing of appropriate unit cells to be stacked together and is otherwise economically inefficient. However, in spite of the obvious drawbacks and long felt need associated with stacking capacitors to achieve the needed operating voltage in a capacitor having a small volume, others have been unable to provide a single unit cell having the required small volume capable of microcompuer memory protection. One area of pursuit has been to provide various capacitor electrode materials having a very large surface area/volume ratio to achieve a high capacitance at a small volume, such as the activated carbon disclosed in the Phillips U.S. Pat. No. 4,438,481. While the volumetric efficiency is substantially improved in the capacitor described in the Phillips et al. '481 patent, each cell has a maximum applied voltage of only about 1.25 V so that four cells must be stacked in series to provide a typical voltage rating of 5 V D.C. as a back-up power source for a typical semiconductor memory device.

Other anode materials, such as the oxide coated valve metals having relatively thick oxide coatings are known to support higher voltages, but the capacitance of such materials is limited because of the smaller surface area and the thickness of the oxide coating. Aluminum and tantalum electrolytic capacitors are typical examples of the use of higher voltage supporting, less capacitance, capacitor electrodes, having relatively thick oxide coatings.

Any reduction in the thickness of the anode oxide coating on these electrodes, while increasing the capacitance of the device, also decreases the maximum voltage that the capacitor can support so that more than one of the capacitors must be stacked in series to achieve necessary voltage rating, at a small volume.

PRIOR ART

A search conducted in Japan directed to the present invention has uncovered the following Japanese patents:

| | |
|---|---|
| JP 52-16204 | JP 56-159067 |
| JP 54-76929 | |
| JP 58-206058 | |

SUMMARY OF THE INVENTION

In accordance with the present invention it has been found that a lithium or lithium alloy cathode, instead of the cathode foils of commercial electrolytic capacitors, can substantially increase the volumetric energy density of a valve metal/metal oxide capacitor. The capacitors of the present invention exhibit a voltage capability unexpectedly higher than the voltage supported by the anode alone. This unexpected advantage is achieved by constructing a capacitor including (1) a negative electrode comprising lithium or a lithium alloy; (2) a positive electrode comprising a relatively high surface area valve metal, having a relatively thin oxide surface film; (3) a separator material disposed between the positive and negative electrodes to physically separate the electrodes and capable of allowing the passage of ions through the material between the electrodes and (4) an organic, non-aqueous electrolyte containing lithium ions and compatible with both electrodes. To achieve the full advantage of the present invention, the positive electrode is formed as a foil or as a sintered (pressed) pellet.

Accordingly, an object of the present invention is to provide a new and improved capacitor having a voltage capability significantly higher than the voltage capability of the anode alone.

Another object of the present invention is to provide a new and improved capacitor including electrodes constructed from materials to provide a significant open circuit potential so that an oxide film layer on one electrode can have a relatively reduced thickness to provide increased capacitance, while remaining capable of supporting a predetermined voltage, without connecting a plurality of capacitors in series.

Still another object of the present invention is to provide a new and improved capacitor including an oxide film coated positive electrode capable of being oxidized to a sufficient film thickness via thermal oxidation, while supporting a sufficient voltage for use as a back-up power source in typical semiconductor memory devices without stacking.

Another object of the present invention is to provide a new and improved volumetrically efficient capacitor including an oxide coated positive electrode, and a lithium negative electrode capable of storing charge chemically (electrolytically) during a charging cycle to significantly increase the energy density of the capacitor.

The above and other objects of the present invention will become apparent from the following detailed description of the invention described with reference to the drawings wherein:

FIG. 7 is a polarization curve for a thermally oxidized rolled aluminum foil in a propylene carbonate electrolyte having a 1 MLiPF$_6$ solute.

FIG. 8 is a graph similar to FIG. 5 showing the cycling performance of the Li/Al alloy / Al$_2$O$_3$/Al capacitor of the present invention wherein the Al$_2$O$_3$ barrier film is applied thermally.

DETAILED DESCRIPTION OF THE PREFERRED EMBODIMENTS

Figures 1A, 1B:
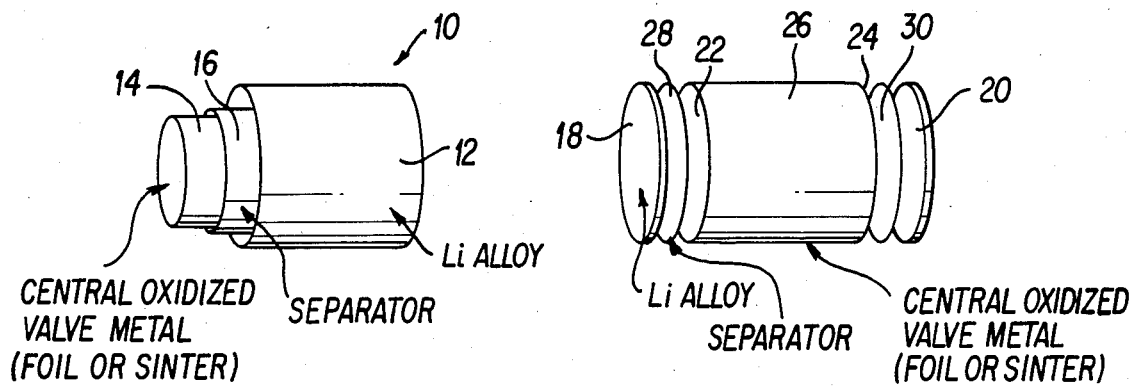
FIGS. 1A and 1B are enlarged, exploded perspective views of alternate constructions of the capacitors of the present invention.

The capacitor of the present invention includes a metal coated with a metal oxide barrier film as a positive electrode and a lithium or lithium alloy negative electrode. The metal of the positive electrode should be a valve metal-that is, a metal which, when coated with an oxide barrier layer and immersed in solution, can transmit current when made negative, but transmits no current when made positive. Suitable valve metals include aluminum, tantalum, niobium, zirconium, and titanium. The oxide barrier coatings on the positive electrodes are provided generally in a thickness of 10 to 30 Angstroms per volt.

The valve metal/metal oxide positive electrode functions as the capacitive element of the device and charge is stored across the oxide barrier coating as in conventional aluminum and tantalum commercial electrolytic capacitors. At the negative electrode the lithium or lithium alloy electrode maintains a potential corresponding to the appropriate reaction:

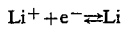

for the lithium electrode and,

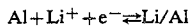

for a lithium-alloy electrode such as lithium/aluminum. This charge is stored chemically rather than capacitively during the charge cycle.

In order that excessive polarization of the negative electrode be avoided, a lithium solute should be maintained in a relatively high concentration e.g. 0.5 to 1.5M in the electrolyte. The electrolyte should be compatible with the valve metal oxide, while providing adequate ionic conductivity.

In accordance with an important feature of the present invention, at low working voltages a lithium or lithium-aluminum negative electrode, instead of the conventional cathode foil of a commercial electrolytic capacitor, can substantially increase the volumetric energy density. To achieve the full advantage of the present invention, the lithium or lithium-alloy electrode is concentrically wound, as shown in the drawings. The provision of chemical (electrolytic) charge storage at the negative electrode provides new and unexpected results, particularly for low voltage capacitors, since the negative electrode capacitance in low voltage capacitors is of a comparable magnitude to the anode capacitance and the series combination lowers the device capacitance. The capacitor of the present invention eliminates this negative electrode series capacitance effect.

In applications where a high equivalent series resistance (e.s.r.) is not prohibitive, such as memory maintenance of CMOS static RAMS, cell designs may be employed to obtain volumetric energy densities of 0.1 FV/cc. To achieve the full advantage of the present invention the volumetric energy density of the capacitors of the present invention is about 0.02 to 0.04 FV/cc to be useful as a microcomputer memory protection device. An acceptable energy density, however, depends upon the cost effectiveness of the materials of construction.

Turning first to FIG. 1a, the capacitor of the present invention, generally designated 10, includes a lithium-/aluminum foil electrode 12 concentrically surrounding a central tubular, wound aluminum anode 14. The two electrodes 12 and 14 are physically separated by a suitable microporous material 16 which allows ionic mobility within an electrolyte filling the volume between electrodes 12 and 14. An example of a suitable microporous material is a microporous polyolefin, such as polypropylene. An alternative is shown in FIG. 1B showing two lithium alloy end plates 18 and 20, capping open ends 22 and 24 of a tubular, wound valve metal/metal oxide anode 26, with annular discs of a microporous separator material 28 and 30, there between.

Figure 3:
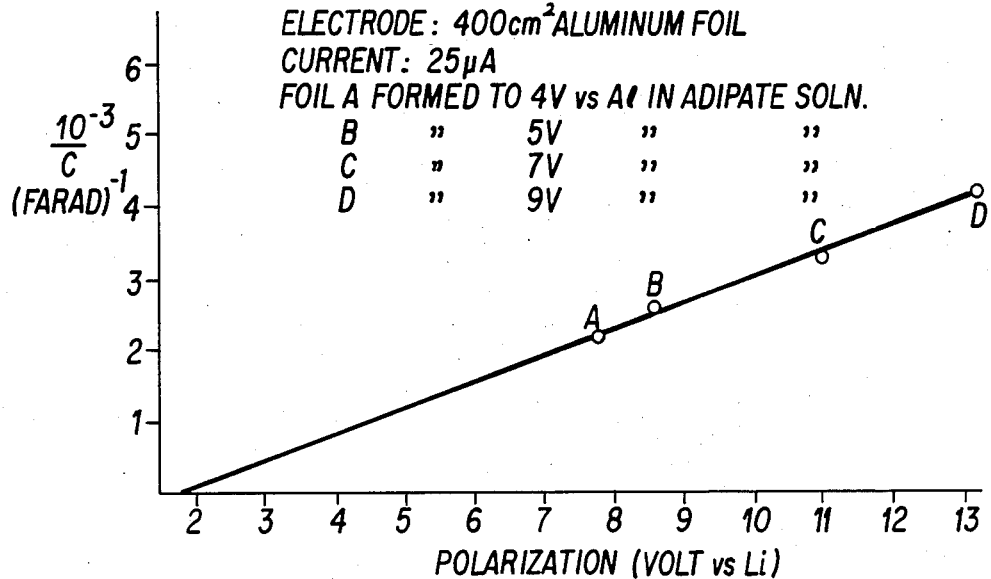
FIG. 3 is a graph the same as FIG. 2 except that the electrolyte is LiPF$_6$-propylene carbonate.
Figure 2:
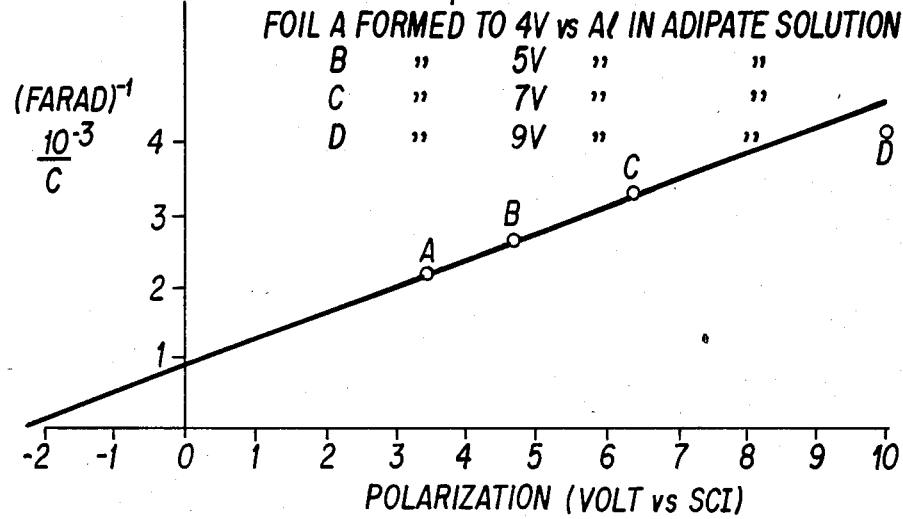
FIG. 2 is a graph showing reciprocal capacity vs. potential in aqueous ammonium adipate solution for aluminum foils having an aluminum oxide barrier film formed at various voltages.

The low potential exhibited by lithium and lithium alloy electrodes such as lithium/aluminum, allows the capacitor of the present invention to demonstrate a voltage capability beyond that voltage which is supported by the anode barrier film alone. This is illustrated by reference to FIGS. 2 and 3 which show the reciprocal of the capacity of several 20 cm$^2$ films plotted against the anodic polarization of the foils subject to a constant current of 25 uA. The foils of FIGS. 2 and 3 were anodized to 4, 5, 7 and 9 V vs Al in an aqueous ammonium adipate solution (pH 7) but were subsequently polarized both in the formation solution (FIG. 2) and propylene carbonate containing 1M LiPF$_6$ (FIG. 3). In each case the intercept on the ordinate of the plot represents the potential of the Al/Al$_2$O$_3$ electrode in the absence of a voltage supporting film. It is evident from FIG. 2 that the film which is formed at 4 V vs Al in aqueous solution corresponds to a film with a thickness capable of supporting 5.7 V above the potential associated with a bare aluminum surface. In a two electrode device, the proportion of this voltage available depends upon the operative voltage of the negative electrode. If this should be aluminum (as in conventional electrolytics) only 70% is available because the aluminum negative electrode operates at a potential positive (by 1.7 V) of the $Al/Al_2O_3$ thermodynamic potential. A lithium-/aluminum electrode, however, operates at 1.37 V negative of the $Al/Al_2O_3$ potential such that a foil formed to 4 V vs Al can support approximately 7.1 V (FIG. 3—the sum of the total voltage across the film and the difference between the $Al/Al_2O_3$ and the $Li/Al/Li^+$ potentials).

In more general terms the maximum voltage ($V_{max}$) supported by a device under load would be given by $$V_{max} = E_f d + E_{m/o} - (E_A + \phi) + IR$$

where $E_f$ is the field strength of the oxide (V/cm);
d is the thickness of the oxide (cm);
$E_{m/o}$ is the redox potential of the valve metal/metal oxide (V);
$E_A$ is the redox potential of the negative electrode (V);
$\phi$ is the polarization of the negative electrode (V);
I is the current flowing (Amp); and
R is the resistance of the electrolyte (Ohms)

Good charge storage capability for the device is therefore favored by a high field strength within the oxide together with a high redox potential for the metal/metal oxide electrode. These factors favor the use of tantalum ($Ta/Ta_2O_5$ $E° = -0.75$, dielectric constant=27) and niobium ($Nb/Nb_2O_5$ $E = -0.64$, dielectric constant=41) over aluminum ($Al/Al_2O_3$, $E° = -1.49$ dielectric constant=8.5), which nevertheless remains favorable because of its low cost. It is, however, difficult to define electrolytes compatible with aluminum oxide because of its more labile nature.

The choice of the electrolyte for the device is a critical factor which determines the electrical performance. Normally capacitor electrolytes contain small amounts of water to facilitate healing of damaged dielectric, but this cannot be tolerated in the presence of lithium or lithium/aluminum, since self-discharge of the negative electrode would occur simultaneously with hydrogen evolution. Not only should the solute/solvent combination be stable in the presence of lithium or the lithium alloy choice but it should also be compatible with the barrier oxide film, i.e. neither solvate nor react with the film.

Figure 4:
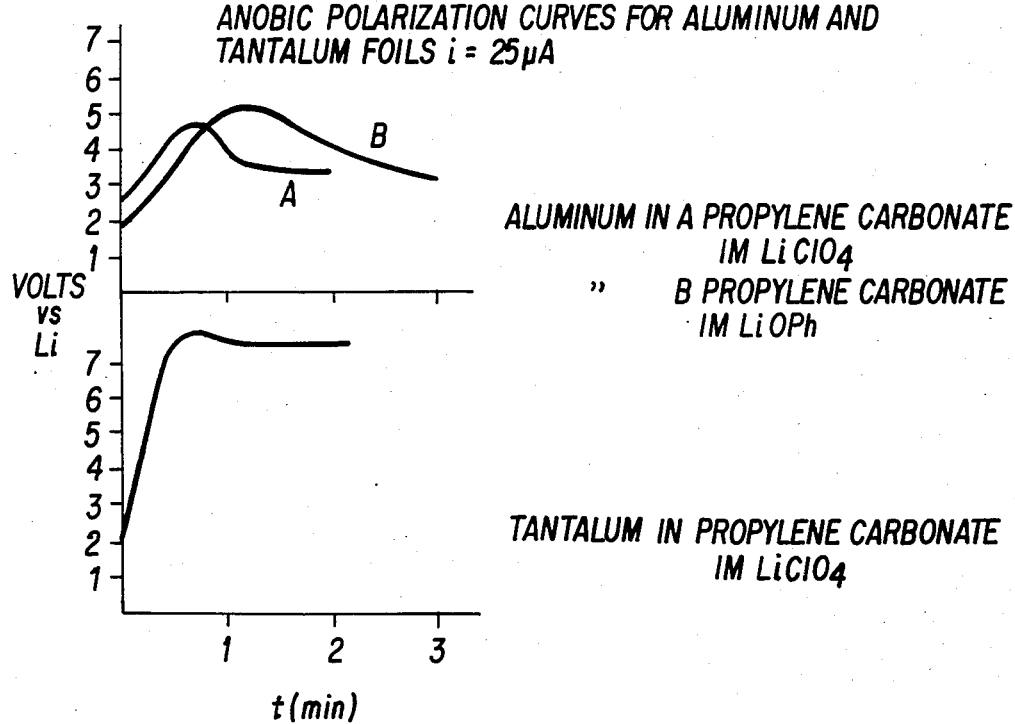
FIG. 4 is graphs showing the anodic polarization curves for aluminum and tantalum foils in electrolytes of propylene carbonate containing two different solutes—LiClO$_4$, and LiOPh.

A number of non-aqueous solvents have been tested and have been found suitable: these include propylene carbonate, butyrolactone, THF and its derivatives (e.g. dimethyl THF), dioxalane and sulfolane. The solute should include lithium ions and an organic, inorganic or organometallic anion, with the specific choice of anion being dependent upon the oxide film in question. For example, phenoxide and $ClO_4^-$ anions in propylene carbonate are incompatible with aluminum oxide but appear quite inert to tantalum oxide. FIG. 4 illustrates the incompatibility of $ClO_4$ and $OPh^-$ anions with $Al_2O_3$ films and the compatibility of the anions with tantalum oxide films when both films are formed to 4 V vs Al in ammonium adipate solution.

Aluminum hydride anions almost completely inhibit any voltage attainment on aluminum oxide while borohydride merely inhibits the attainment of the expected voltage. The anions found to be compatible with the barrier oxide film were identified by conducting constant current polarization tests. The foils (formed at 4 V vs Al in aqueous adipate solution) which achieved a steady voltage above 6.5 V vs Li were considered compatible with the electrolyte. The anions compatible with lithium or lithium-alloy negative electrodes and aluminum/aluminum oxide positive electrodes are $AsF_6^-$, $PF_6^-$, $B(Ph)_4^-$, $CN^-$, $N(SiMe_3)_2^-$, $BF_4^-$ and benzoate ion.

The electrical performance of the device has been examined in propylene carbonate containing 1M $LiPF_6$ using both electrochemically and thermally formed aluminum oxides. For the electrochemically formed foil, a thin strip of 80 um thick A.C. etched foil (1.8 cm × 28 cm) was attached to an aluminum tab and was rolled tightly to form an anode. Anodization was carried out in ammonium adipate solution (pH 7) and the foil was washed and dried at 90° C. The negative electrode was prepared by the deposition of lithium (0.63 mA/cm² for 1 hour) onto an annealed 90 um thick aluminum foil of area 4 cm². This Li/Al foil then was wrapped around a central aluminum core using microporous polypropylene as the separator material. The energy denisty of the device was 0.11 FV/cc.

Figure 5:
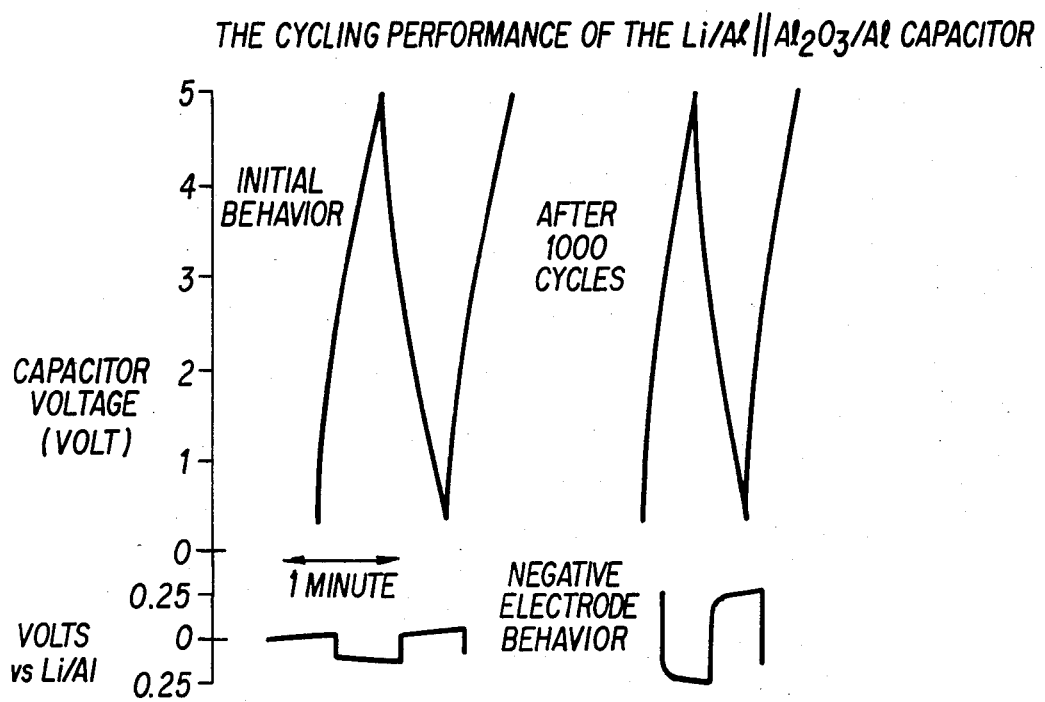
FIG. 5 is a graph showing the cycling performance of a capacitor constructed in accordance with the present invention (Li/Al alloy / Al$_2$O$_3$/Al).
Figure 6:
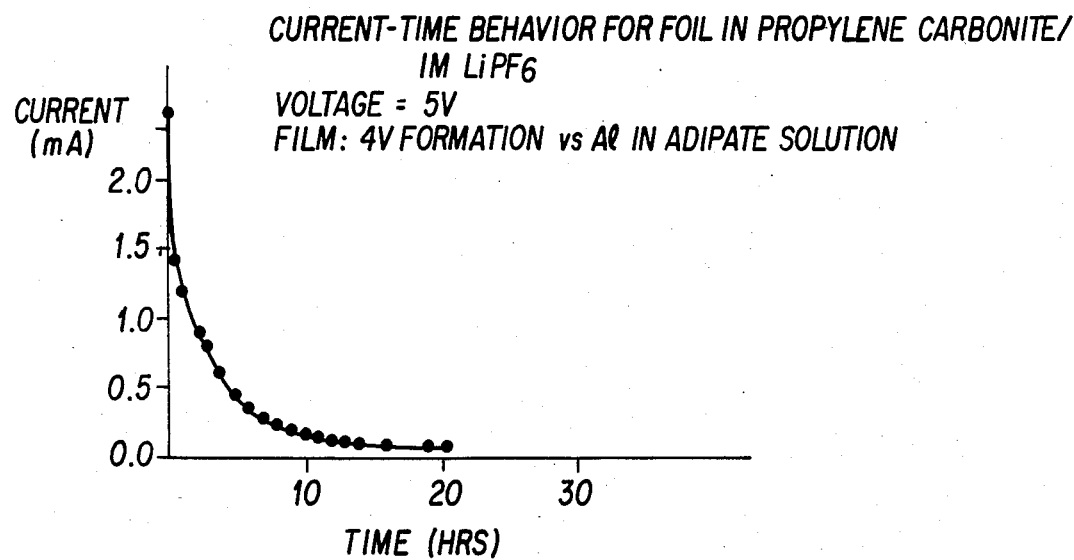
FIG. 6 is a graph showing the current/time behavior at 5 V of Al$_2$O$_3$/Al foil formed at 4 V. vs. aluminum in ammonium adipate in an electrolyte of propylene carbonate having a 1M LiPF$_6$ solute.

Prior to cycling, the foil was polarized anodically at 1 mA and the final voltage of 5.75 V vs Li/Al was noted. After 1000 cycles between 0.3 and 5.0 V at 1 mA, the foil still could support 5.75 V indicating no degradation of anodic film had occurred. FIG. 5 shows the initial and final behavior of the device. The measured capacitance changed 20% over the duration of the test; this appears to result from increased polarization at the negative electrode. Under a 5 V constant potential the current-time behavior indicated the stability of the device (FIG. 6).

In accordance with another important feature of the present invention, an alternative method of anode oxide film formation is by thermal oxidation. Thermal oxidation has the advantage of being easily accomplished but is not amenable to growing uniform films capable of supporting more than a few volts. Turning now to FIG. 7, a rolled aluminum foil was thermally oxidized at 400° C. for 13 hours and the polarization was tested at 1 mA in both ammonium adipate and $LiPF_6$/propylene carbonate. In the ammonium adipate solution the voltage was 0.95 V vs SCE, while in the $LiPF_6$/propylene carbonate solution, the voltage was 5.35 V vs Li. A device was assembled as shown in FIG. 1A and a cycling test was initiated at 1 mA over the voltage range 0.1 to 3.45 V. FIG. 8 shows that over the 1000 cycles the capacity of the device decreased by 29%. It is not clear whether this reflects the superiority of the anodized film over the thermally formed film.

The above examples described herein all involve the lithium/aluminum electrode formed electrochemically on an aluminum foil. This has been adequate for the demonstration of the principle that such an electrode can be cycled continuously over the regime described, however, other forms of the electrode, e.g. pressed pellet could be used. In addition, other alloys of lithium such as lithium-silicon or lithium/boron could serve equally as well.

What is claimed and desired to be secured by Letters Patent of the United States is:

1. An electrical capacitor comprising a negative lithium or lithium alloy electrode; a positive electrode formed from a metal coated with a barrier metal oxide, said metal selected from the group consisting of aluminum, tantalum, niobium, zirconium and titantium; a physical separator material separating the positive and negative electrodes and capable of allowing ionic travel from one electrode to the other; and a lithium ion-containing, non-aqueous electrolyte contacting and compatible with both electrodes.

2. The electrical capacitor of claim 1 wherein the positive electrode is a aluminum/aluminum oxide electrode.

3. The electrical capacitor of claim 2 wherein the positive electrode is a aluminum/aluminum oxide foil.

4. The electrical capacitor of claim 2 wherein the positive electrode is a tantalum/tantalum oxide foil.

5. The electrical capacitor of claim 2 wherein the positive electrode is a sintered pressed pellet.

6. The electrical capacitor of claim 1 wherein the positive electrode is a tantalum/tantalum oxide electrode.

7. The electrical capacitor of claim 6 wherein the positive electrode is a sintered pressed pellet.

8. The electrical capacitor of claim 1 wherein the negative electrode is a lithium-aluminum alloy electrode.

9. The electrical capacitor of claim 1 wherein the metal oxide barrier film is thermally applied.

10. The electrical capacitor of claim 9 capable of supporting a voltage of at least 4 V D.C. per cell.

11. The electrical capacitor of claim 9 wherein the concentration of solute in the electrolyte is 0.5M to 1.5M.

12. The electrical capacitor of claim 1 wherein the positive electrode is a niobium/niobium oxide electrode.

13. The electrical capacitor of claim 1 wherein the positive electrode is a zirconium/zirconium oxide electrode.

14. The electrical capacitor of claim 1 wherein the positive electrode is a titanium/titanium oxide electrode.

15. An electrical capacitor comprising a positive metal/metal oxide electrode, a negative lithium/silicone alloy electrode, a separator material physically separating the positive and negative electrodes and capable of allowing ionic travel from one electrode to the other, and a lithium ion-containing non-aqueous electrolyte contacting and compatible with both electrodes.

16. The electrical capacitor of claim 15 wherein the negative electrode is a lithium/boron alloy electrode.

17. The electrical capacitor of claim 15 wherein the electrolyte includes a solvent selected from propylene carbonate, butyrolactone, THF or its lower alkyl substituted derivatives, dioxalane, and sulfolane.

18. The electrical capacitor of claim 17 wherein the electrolyte includes a solute comprising lithium ions, and an organic, inorganic or organometallic anion.

19. The electrical capacitor of claim 18 wherein the positive electrode comprises a tantalum/tantalum oxide electrode and the electrolyte solute includes $C_6H_5O^-$ anions, $ClO_4^-$ anions or a mixture thereof.

20. The electrical capacitor of claim 19 wherein the electrolyte solvent comprises propylene carbonate.

21. The electrical capacitor of claim 18 wherein the positive electrode is an aluminum/aluminum oxide electrode and the electrolyte solute includes one or more anions selected from the group consisting of $AsF_6^-$, $PF_6^-$, $B(Ph)_4^-$, $CN^-$, $N(SiMe_3)_2^-$, $C_6H_5O_2^-$ and $BF_4^-$.

22. The electrical capacitor of claim 21 wherein the electrolyte solvent is propylene carbonate.

23. The electrical capacitor of claim 21 wherein the electrolyte solute is selected from the group consisting of $LiAsF_6$, $LiPF_6$, $LiB(Pn)_4$, $LiCN$, $LiN(SiMe_3)_2$, $LiC_7H_5O_2$ and $LiBF_4$.

24. The electrical capacitor of claim 23 wherein the concentration of solute in the electrolyte is as least 1.5M.

* * * * *